United States Patent [19]

Volnak

[11] Patent Number: 4,467,321

[45] Date of Patent: Aug. 21, 1984

[54] CHORDING KEYBOARD FOR GENERATING BINARY DATA

[76] Inventor: William M. Volnak, 50 Birch St., Mill Valley, Calif. 94941

[21] Appl. No.: 373,569

[22] Filed: Apr. 30, 1982

[51] Int. Cl.³ .............................................. G06F 3/02
[52] U.S. Cl. .......................... 340/365 VL; 340/365 R; 340/407; 340/365 A; 200/5 A
[58] Field of Search ............ 340/365 R, 365 VL, 712, 340/407; 365 E, 365 A; 84/1.01; 200/5 A; 178/17 C

[56] References Cited

U.S. PATENT DOCUMENTS

| | | | |
|---|---|---|---|
| 2,581,665 | 1/1952 | Jarmann | 340/365 R |
| 3,022,878 | 2/1962 | Seibel et al. | 340/365 R |
| 3,428,747 | 2/1969 | Alferieff | 178/17 |
| 3,831,296 | 8/1974 | Hagle | 340/407 |
| 3,833,765 | 9/1974 | Hilborn et al. | 178/17 C |
| 4,017,848 | 4/1977 | Tannas, Jr. | 340/365 R |
| 4,042,777 | 8/1977 | Bequaert et al. | 178/17 C |
| 4,078,257 | 3/1978 | Bagley | 340/365 VL |
| 4,107,784 | 8/1978 | Van Bemmelen | 340/365 VL |
| 4,109,118 | 8/1978 | Kley | 200/5 R |
| 4,343,216 | 8/1982 | Swain et al. | 84/1.01 |
| 4,360,892 | 11/1982 | Endfield | 340/365 S |
| 4,385,366 | 5/1983 | Housey | 340/365 VL |

Primary Examiner—James J. Groody

[57] ABSTRACT

A data entry device wherein key switches may be pressed singly and in combination to generate a binary number corresponding to specific characters and character combinations. A preferred embodiment of the invention contemplates ten key switches, each key switch corresponding to a different terminating member of an operator's hand, such that a 10-digit binary number is generated. Other embodiments of the present invention contemplate a programmable keyboard wherein characters and character combinations generated by user operation of the keyboard are stored in a portable memory for later access by the operator. Additionally, the device may be operated in reverse such that binary numbers corresponding to characters and character combinations may be converted to patterns of tactile sensations perceived as characters and character combinations.

2 Claims, 6 Drawing Figures

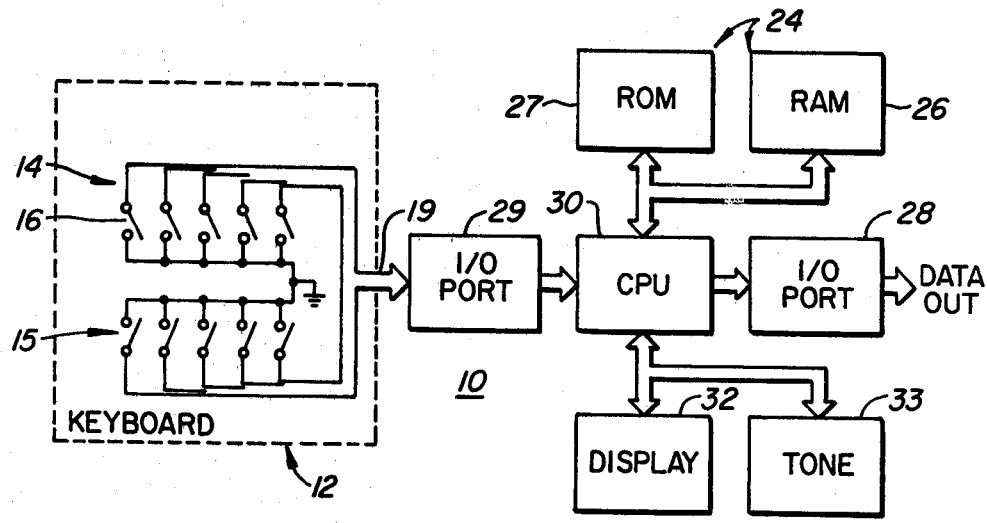
FIG._1.
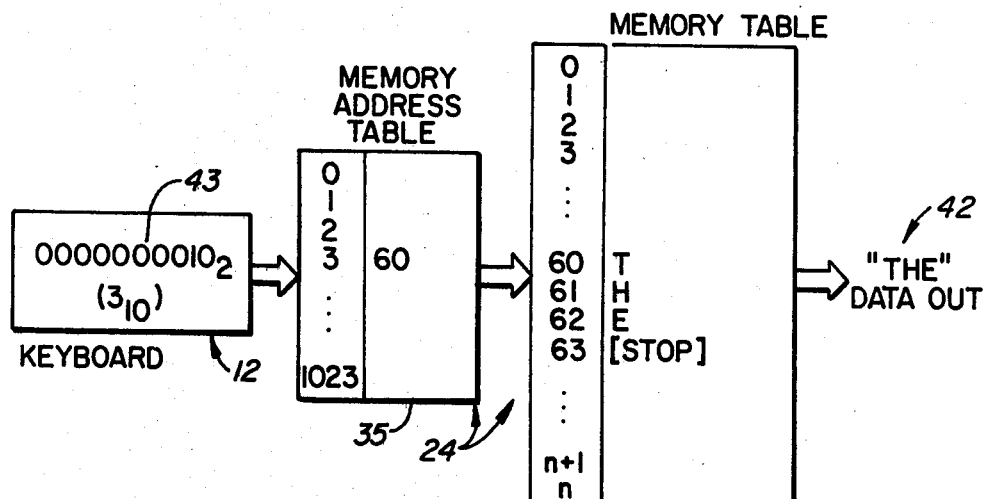
FIG._2.
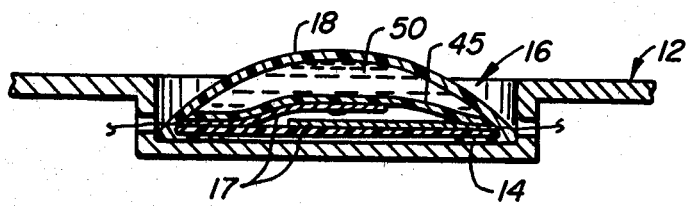
FIG._6.

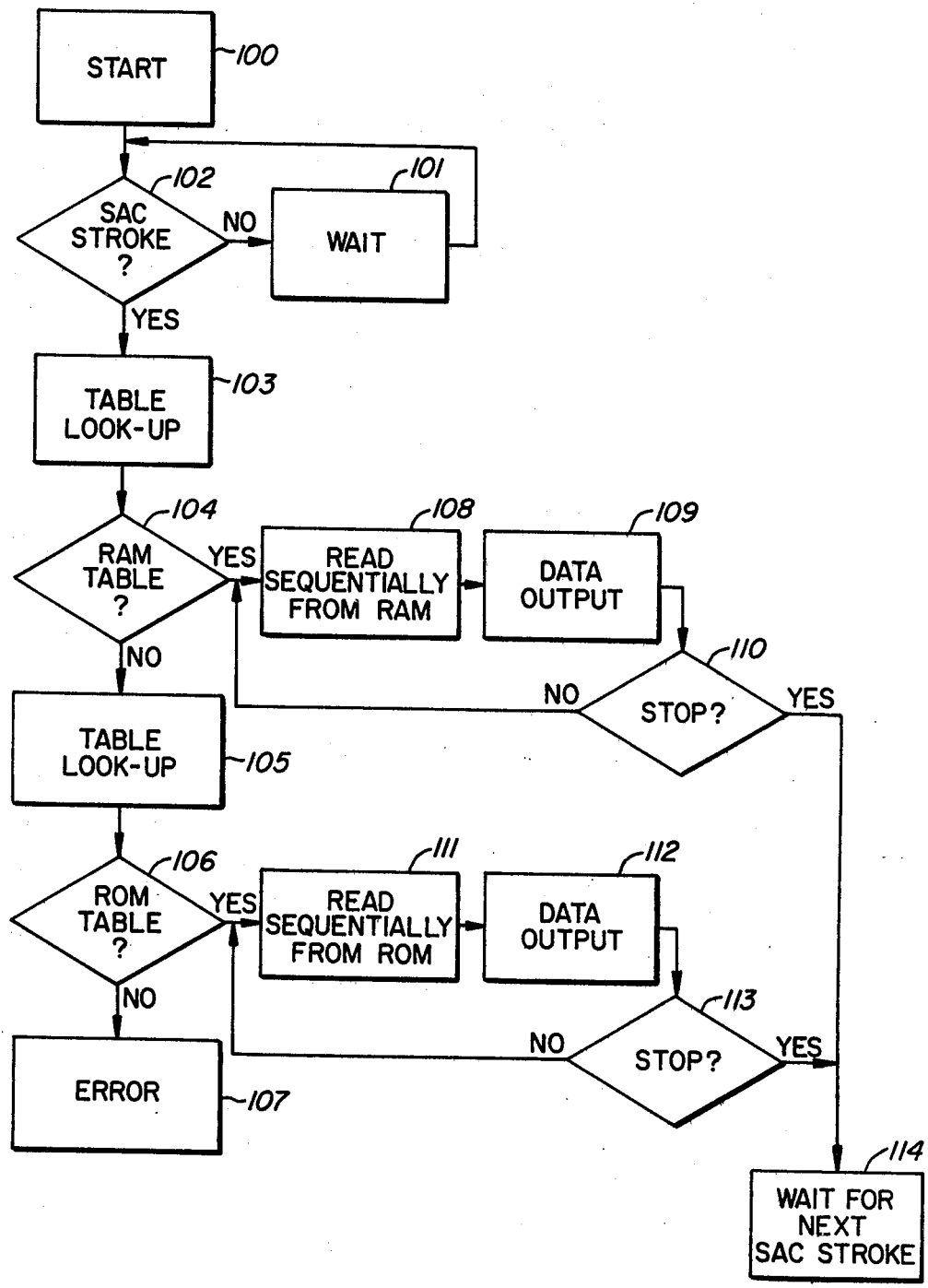
FIG._3.

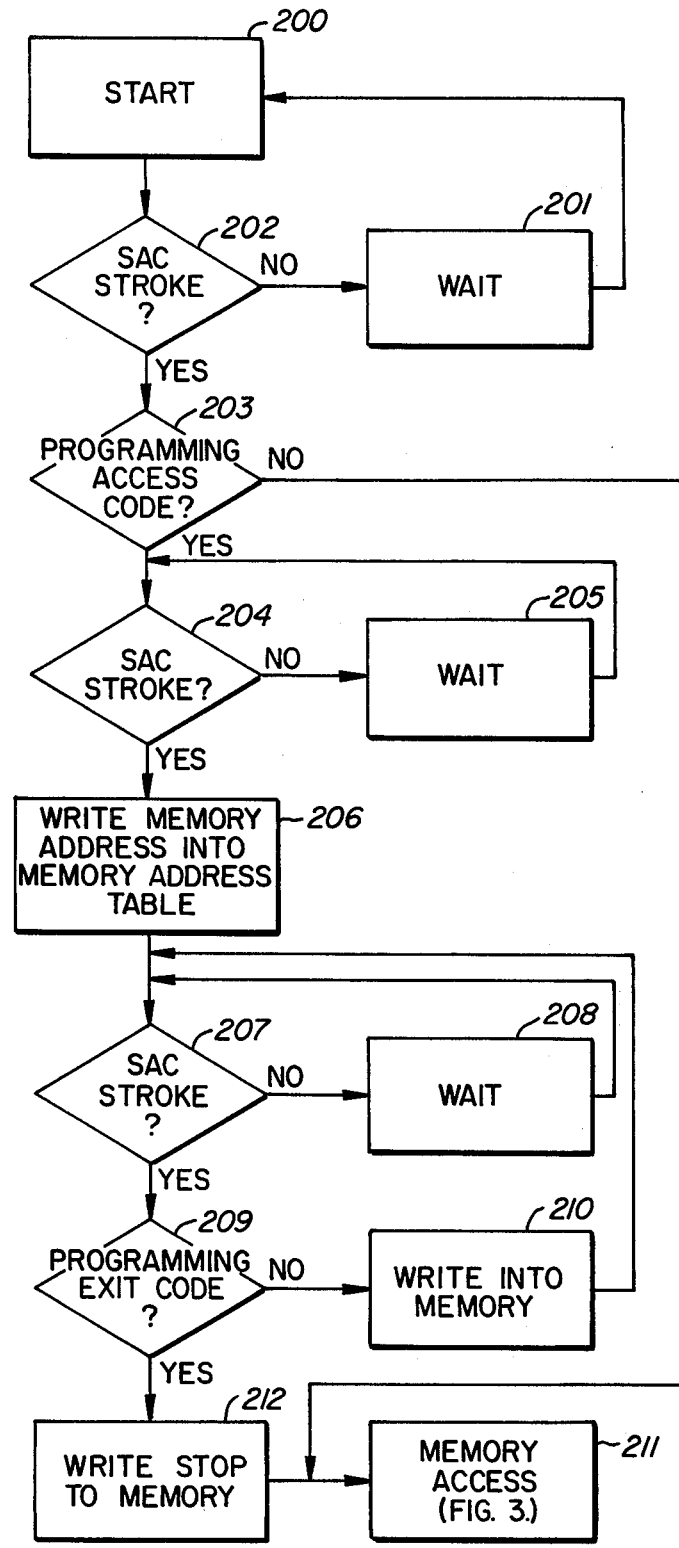
FIG._4.

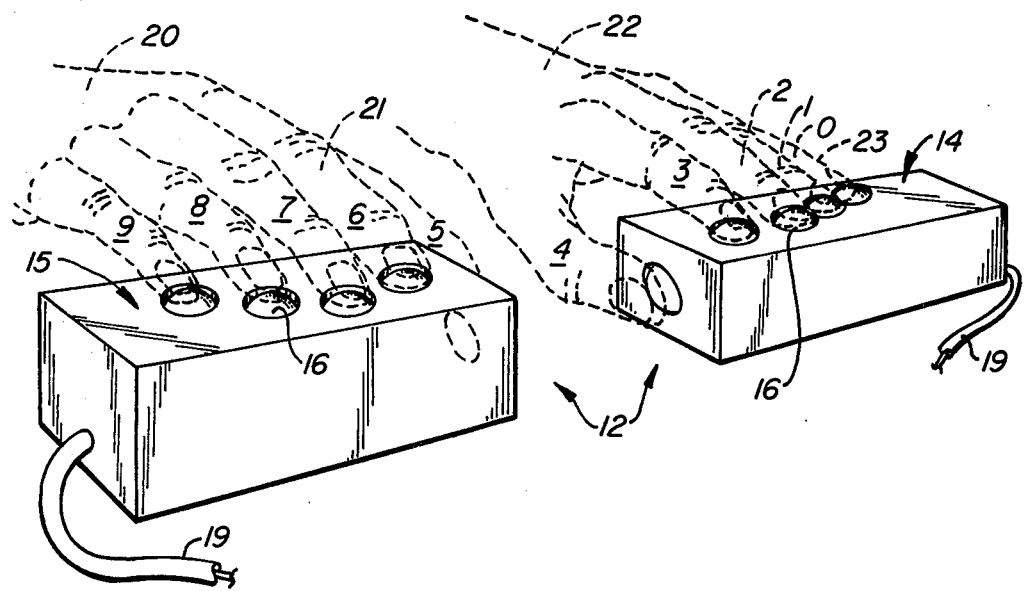
FIG._5.

CHORDING KEYBOARD FOR GENERATING BINARY DATA

BACKGROUND OF THE INVENTION

1. Field of the Invention

The present invention relates to devices for entering data into computers and, in particular, to a keyboard for entering data into computers by pressing the keys of the keyboard singly and in combination.

2. Description of the Prior Art

In the beginning, there was Guttenberg and movable type. Man no longer had to chisel characters into stone or laboriously hand draft them onto parchment. If someone had an idea, he need only write it down once and unlimited copies could be made; if someone needed knowledge, he could look it up in a book.

The development of civilization is directly linked to improvements in communication of information between people. Thus, printing led to the invention of the typewriter; the typewriter led to the invention of the computer.

Following the invention of the computer, the physicl speed limits of communication were rapidly approached. People had always thought faster than their machines could be operated. For example, the typewriter keyboard was originally laid out in a manner that inhibited typing speed. The machine just couldn't keep up with the typist. To remedy this the QWERTY keyboard was developed.

With the computer, machines began thinking faster than people. The actual movement of fingers across a typewriter keyboard is now a serious physical limitation hampering the speed of data and information transfer. It is estimated that a good typist's fingers can travel from 12 to 20 miles in a day's work using standard QWERTY keyboards. The jumping and hurdling of fingers from key to key increases physical exertion by the typist. Additionally, significant mental effort is expended in finding proper key/finger registration. The registration problem is most pronounced in the case of a blind or handicapped typist. Furthermore, the traditional keyboard attains unwieldy proportions when adapted for symbolic alphabets, such as Chinese.

While almost everything else related to computers has become smaller, simpler, cheaper, and more efficient, keyboards have become larger, more complex, more expensive, and less efficient. Current keyboards can have almost one hundred keys: alphabetic, numeric keypad, cursor movement control, and function buttons. Touch typing on such keyboards is no longer possible. And one keying error can lose an operator hours of work. Moreover, these keyboard layouts are not standardized so that, as more different computers are used, more time must be spent learning the new layouts and more errors are endured during the learning.

There has been recognition in the prior art that keyboards have not evolved with advances in technology. Yet, the fastest modern computer, as one of its basic components, still has a primitive QWERTY keyboard for entering data.

About 50 years ago, August Dvorak introduced a simplified keyboard that grouped and centralized commonly used letters. Although there was some increase in speed, the system never caught on.

A more recent attempt at reorganizing the standard QWERTY keyboard has been made by Lillian Malt and Stephen Hobday in a system referred to as the Maltron system. The Maltron system offers no reduction in number of keys to be operated or in the amount of finger movement necessary to operate the keys. Although the Dvorak and Maltron keyboards are easier to use, they exhibit no new principle and are just as difficult to learn as the standard QWERTY keyboard. It is doubtful that business enterprises can justify the time it takes to train typists on these systems. It would take decades of slightly increased productivity resulting from such traning to recover the initial training cost.

A 12-key data entry system was proposed by Jarmann in U.S. Pat. No. 2,581,665. The system involved two hand-operated drums, each drum having 6 finger-operated keys. To enter data the operator's fingers pressed one of the 12 keys. The drums were rotated to four possible positions corresponding to four rows of keys. Thus, data entry required twisting the drums and pressing the keys in combination. This was a rather clumsy mechanical arrangement for operating a standard QWERTY keyboard with solenoids and motors. Basically an attempt to make manual typewriters into electric typewriters, this device was not successful.

A one-handed data entry device shown by Seibel in U.S. Pat. No. 3,220,878 takes the form of a glove worn over the operator's hand. The operator's fingers were moved to several different positions to generate different characters. Such a system is extremely fatiguing and registration is exceedingly difficult to learn.

Alferieff in U.S. Pat. No. 3,428,747, shows a condensedd keyboard where the amount of finger movement is slightly reduced, although mental effort is increased significantly. Each finger was still responsible for several keys; the close proximity of the keys probably made frequent errors the rule rather than the exception when using the device.

A one-handed keyboard is suggested by Bequaert et al. in U.S. Pat. No. 4,420,777. Again, the operator must press several keys with each finger. Much mental effort is required to remember finger placement. Although the keys may be pressed in combination, there is still a significant amount of awkward finger movement required during operation. The proximity of the finger keys to each other makes operation of the keyboard confusing, fatiguing, and conducive to operator error. Additionally, the thumb is expected to be stretched across four keys while stretching the fingers across 10 keys with dozens of possible combinations. This is hardly a simplification of the standard QWERTY keyboard.

SUMMARY OF THE INVENTION

The present invention is a device for entering data into a computer or other such data processing or data storage medium. In one embodiment of the invention, the keyboard consists of 10 keys—one for each terminating member of an operator's hand. The keys are pressed singly and in combination to create 10-digit binary numbers. A small computer within the keyboard uses the binary numbers to access an internal table of unique strings of ASCII characters. The characters are output to a main computer.

The keys are of a unique, novel, and unobvious construction in that fluid filled sacs are interposed between the electrical contacts of the keyboard switches and the operator's fingers. The result is an effortless yet positive keystroke providing a natural tactile sensation wherein the finger is not stopped with a jolt but rather with a gradually increasing resistance as the fluid is compressed.

Another embodiment of my invention comtemplates operator programming of the keyboard for personal or specialized characters and character combinations. These personal character "codes" may be stored in a removable memory chip having a separate "keep alive" power supply. The operator may use these "codes" at any other keyboard of this type. Thus, each keyboard is personal to the particular operator and specialized for the particular application.

Additionally, a further embodiment of my invention contemplates a reverse keyboard wherein terminating members of a receiving person's hand are stimulated singly and in combination to transfer information from a computer or other such device to the receiving person.

BRIEF DESCRIPTION OF THE DRAWINGS

The present invention is best understood by referring to the specification and the following drawings, in which:

FIG. 1 is a block diagram of an embodiment of the present invention;

FIG. 2 is a block diagram of a memory addressing scheme according to the present invention;

FIG. 3 is a flow diagram showing a keystroke sequence according to the present invention;

FIG. 4 is a flow diagram of a keyboard programming sequence according to the present invention;

FIG. 5 is a perspective view of one embodiment of the keyboard according to the present invention; and FIG. 6 is a side, cross-sectional view of a key switch according to the present invention.

DETAILED DESCRIPTION OF PREFERRED AND ALTERNATE EMBODIMENTS

The present invention is a device for entering data into a computer or other such data processing or data storage medium by operation of the key switches on a keyboard singly and in combination. The data entry device 10 is shown in block diagram in FIG. 1.

A keyboard 12 consists of a plurality of key switches 16. The key switches 16 may be operated singly or in combination; each key switch corresponds to a digit in a binary member. Keyboard 12 has ten key switches 16; therefore, each key switch 16 is a particular digit in a 10-digit binary number. The keyboard may have many different shapes, as is appropriate for the particular application, although its operation is the same in each instance.

The binary number generated by operation of the key switches is routed across bus 19 to an input port 29. The input port acts as a buffer between keyboard 12 and CPU 30.

When the keyboard is operated, a binary number is presented to the CPU. In one embodiment of my invention, the CPU triggers a tone 33 each time it receives a binary number from the keyboard. Another embodiment of my invention contemplates the generation of a different tone for each number of keys pressed. Thus, if four keys are pressed, one tone is generated; if seven keys are pressed, another tone is generated, and so on. The purpose of the tone is to provide audible feedback to a keyboard operator in much the same way the clicking of typewriter keys against a typewriter roller confirms that the paper has been struck. The generation of a different tone for each number of keys pressed provides reassurance that the correct number of key switches have been pressed by the operator.

When CPU 30 receives a binary number from the keyboard 12 (FIG. 1), a corresponding memory address is accessed. The CPU 30 looks at that memory address in the read only memory (ROM) 27 to locate a character or a series of characters corresponding to the binary number of generated at the keyboard. Addressing is indirect as shown in FIG. 2 and discussed below. In a different embodiment of my invention the CPU, if unable to locate the memory address corresponding to the keyboard input binary number in a random access memory (RAM) 26 containing additional characters and character combinations, then looks into the ROM.

When the CPU has found the desired memory address, the ROM 27 (or RAM 26) returns the corresponding character or character combination to the CPU. In one embodiment of my invention, the CPU scrolls the characters and character combinations across a display 32. The display may provide immediate visual feedback of characters or character combinations as they are generated or it may provide verification of address contents or address availability during a "write" mode discussed below. The characters or character combinations retrieved from memory are transmitted through output port 28 to a computer, or other data processing or data storage device.

The keyboard 12 is composed of a plurality of key switches 16. The arrangement in FIGS. 1 and 5 shows ten key switches arranged in two banks 14 and 15. Key switch bank 14 is operated by the user's left hand; key switch bank 15 is operated by the user's right hand. Each key switch on each key switch bank corresponds to a different terminating member of the operator's hand (FIG. 5).

In FIG. 5, the keyboard 12 is shown as comprising two grips corresponding to key switch banks 14 and 15. Thus, the left hand 22 has terminating members 23 operating left hand key bank 14; the right hand 20 has terminating members 21 operating right hand key bank 15.

The arrangement in the embodiment shown in FIG. 5 comprises 10 key switches 16, each key switch corresponding to a digit in a 10 digit binary member. Therefore, there are 1,024 combinations of key switch operation. Operation of the key switches in combination is referred to as chording, much like the chording of a musical instrument.

In another embodiment of my invention the hand operated key switches may be augmented by the addition of foot, elbow, knee, etc. switches to provide an even greater number of possible combinations. Thus, the number of possible characters and character combinations may be considerable enough to include symbolic or pictographic alphabets such as Chinese or Japanese.

Additionally, the keyboard is readily adaptable for use by handicapped persons. Thus, in the case of quadriplegia wherein the handicapped person may only have the use of a few toes or facial muscles, the keyboard may have a rather large, built-in vocabulary to enable that person to communicate with others using words built upon keyboard chording.

The key switches incorporated into my invention are of a novel and unique configuration. The key switch 16 normally has a substrate 44 supporting two normally open contacts 17. A membrane 45 seals the contacts from the environment. The present invention (FIG. 6) includes a fluid filled hemispherical sac 18. Pressing the sac 18 with a terminating member of an operator's hand, for example, compresses the fluid. The fluid 50 may be a liquid, a gel, or other such compressible fluid, depending upon desired keyboard "touch". The force imparted to the sac is communicated through the fluid 50 of the switch contacts 17, thereby closing the switch. In this way, the key switches have a very natural, typewriter keyboard feel. The result is an effortless yet positive key stroke providing a natural tactile sensation. The volume of the hemispheres may be slightly altered by a screw arrangement so the operator can adjust the sensitivity of each sac to suit his habits. Thus, the finger-tips may always rest on the sacs, thereby greatly reducing physical movement and fatigue. Because the fingers need move far shorter distance than with conventional keyboards, operator keying speed is enormously increased.

FIG. 3 is a flow diagram of a key stroke sequence. At the start (100) of a data entry the CPU 30 watches for the operation of key switches (sac strokes) and waits until a sac stroke is detected (102).

The terminating members of the operator's hand do not all press with the same force at the same time. The CPU includes a timing loop means (not shown) that continually reads the keyboard output as presented through port 29 to the CPU. Each time the input is read a corresponding binary number is generated. During the several cycles of scanning the keyboard output, the size of the binary number produced varies because all of the key switches are not closed simultaneously. The CPU continually scans the input from the keyboard until the largest number generated during the sac stroke is detected. The CPU then uses the detected binary number to do a table lookup (103).

FIG. 2 shows a binary number (43) generated by the keyboard 12 during a sac stroke sequence. In the example, the binary number corresponds to $3_{10}$. The CPU checks a memory address table 35 within the memory means 24 (103). The address at the memory address table 35 corresponding to the binary number from the keyboard contains the starting address of the character or character combinations in memory table 34. More than one character may be stored for each sac stroke. In the example, the number $3_{10}$ at memory address table 35 corresponds to memory table address 60.

Memory table address 60 is the starting point for a particular character combination corresponding to the binary number generated by keyboard operation. The memory table is read sequentially from the starting point until a stop is encountered. In the example of FIG. 2, addresses 60, 61, 62, and 63 are read. Address 60 contains the letter T, 61 the letter H, 62 the letter E, and 63 a stop. Thus, the word "THE" (42) is routed to the output ports 28 and thence to a computer or other such device.

Referring to FIG. 3, in one embodiment of the present invention the CPU first looks for the memory address in a RAM memory address table (104). If the memory address is found in the RAM table, the memory is read sequentially from the RAM (108) and data is output (109) until a stop is encountered (110) in the RAM memory. When a stop is encountered the CPU waits for the next sac stroke (114). If the memory address is not in the RAM table the CPU does an additional table look up (105) to determine if the memory address is in the ROM memory table (106). Additionally, a ROM table look-up is performed if an "empty" marker is found in the RAM at a given location. This allows the user the option of "overriding" various ROM locations in favor of RAM locations containing personal or special characters or character combinations.

If the CPU does not find the memory address in the ROM table, then there is an error (107). If the address is in the ROM table, the memory is read sequentially (111) and the data located is output (112) until a stop is encountered (113) in the ROM memory. This process repeats until the stop is encountered, at which point the CPU waits for the next sac stroke (114).

In another embodiment of my invention a RAM containing strings of ASCII characters may be included. The RAM is programmable by an operator such that, within the limitations of storage space in the RAM, personalized character combinations may be stored, such as names, addresses, etc. The RAM is personal to the operator or specific to the particular application. Thus, an individual may carry his own personal RAM with him much like an identification card. To protect the contents of and access to a personal RAM, one embodiment of the RAM is "password protected" and requires user entry of a personal identification code. The RAM is interchangeable in any machine equipped with my invention such that the operator can use his personal RAM on any device constructed according to the present invention. In this way, any office equipped with my invention becomes instantly personal to the operator or specific for the applications to which the invention is to be put. A "keep alive" power source is provided with the RAM to retain data entered therein.

A typical programming sequence for the RAM is illustrated in FIG. 4. At a start position (200) the CPU is waiting for a sac stroke (202) as discussed earlier. If a sac stroke is not detected, the CPU continues waiting (201). When a sac stroke is detected, the CPU looks for a particular sac stroke binary number corresponding to the programming access code (203). If a programming access code is not detected the keyboard operates as is shown in FIG. 3 (211). If a programming access code is detected, the RAM is set to a WRITE mode and the CPU monitors its input for following sac strokes (204). If sac strokes are not encountered the CPU continues to wait (205).

After a programming access code is entered by an operator, the operator next enters the memory address to be programmed through the keyboard. The CPU monitors the keyboard such that the memory address selected by the operator is placed into the memory address table (206). Memory addresses containing data may have their contents altered or "written over." When an "occupied" address is encountered, the display indicates that the address is already assigned and the operator must verify that he wants to alter said address. Altering a given address may require rearranging the entire RAM memory table. For instance, a shorter character combination would leave an empty spot in memory; a longer character combination could cause an overlap with another character combination. Memory management and associated housekeeping takes place at the end of a WRITE session such that memory is allocated in an efficient manner.

After the programming access code is entered and the memory address is written into the memory address table, the operator may then enter sac strokes into the RAM memory corresponding to desired sequences of characters. A display may be included to verify correct data entry. The CPU monitors the keyboard for sac strokes (207) and waits (208) until they are detected.

The CPU also watches for a programming exit code (209). Until the programming exit code is detected, characters corresponding to operator sac strokes are placed into memory (210).

The programming exit code can be the entry of a stop code into memory (212). However, for programming more than one character combination into memory several memory address table locations may be necessary. In this instance, the detection of the entry of a stop code may place the keyboard in a condition to write another memory address into the memory address table. The process of programming the memory with character combinations then continues until a programming exit code is detected (209) at which point operation of the device returns to memory access (211) as shown in FIG. 3.

A still further embodiment of my invention contemplates converting binary numbers supplied by a computer or other storage device into tactile impulses. Thus, the keyboard shown in FIG. 5 operates in reverse. Electromechanical devices such as solenoids or transducers can be substituted for the key switches 16 such that a blind or handicapped person would perceive patterns of sensations corresponding to characters, character combinations, or a vocabulary of different words. Additionally, the device can be fitted to animals such that the various combinations of tactile sensations correspond to simple commands to the animal.

Learning to operate the present invention is a simple matter. A suggested table of character "codes" follows in which key combinations represent the letters of the alphabet.

| Keys | Character | Keys | Character |
|------|-----------|------|-----------|
| 45 | space | 48 | f |
| 56 | e | 14 | g |
| 35 | t | 23 | y |
| 46 | a | 68 | p |
| 34 | o | 16 | w |
| 57 | n | 27 | b |
| 25 | r | 38 | v |
| 36 | i | 13 | k |
| 47 | s | 78 | x |
| 24 | h | 17 | j |
| 58 | d | 28 | q |
| 67 | l | 12 | z |
| 15 | u | | |
| 26 | c | | |
| 37 | m | | |

Each terminating member of an operator's hand has been numbered (FIG. 5) starting with the left hand pinky as "∅" and ending with the right hand pinky as "9". The character codes have been logically assigned based on frequency of distribution of a particular letter in the alphabet and on relative strength of the various terminating members. Thus, the thumbs (4, 5) generate a "space", the index fingers (3, 6) generate the "i", and the pinkies are not assigned. The pinkies are used as shift keys in generating upper-case alphabetics, punctuation, and special characters. Additional characters, numbers, punctuation, and character combinations may be assigned "codes" as necessary.

To learn the various codes many mneumonic devices are available and have been available for centuries. For example, a method of converting digits to English consonant sounds and associating items on lists to be remembered with each other is suggested in *The Memory Book* by Lucas and Loraine. Other systems may also be used to each the various codes.

The present invention may have many applications and embodiments as evidenced from the foregoing. Therefore, the scope of the invention should be limited only by the breadth of the following claims.

I claim:
1. A computer data entry keyboard comprising:
   ten key-switches, each key-switch corresponding to, in continuous intimate contact with, and adapted to be selectably operated by a particular terminating member of a pair of operator's hands, said switches being selectably operable singly and in combination to generate a ten digit binary number, each digit of said binary number corresponding to a particular terminating member of said operator's hands;
   user alterable memory means for storing character and character combinations in sequential memory addresses, including:
   (a) read only memory means for storing and retrieving standard characters and character combinations, each corresponding to a particular one of said selective ten digit binary number; and
   (b) a random access module for operation in an alter mode wherein operation of said key switches stores characters and character combinations each corresponding to a particular one of said selected ten digit binary numbers, at sequential memory addresses to labels key switches as desired, and for operation in an access mode wherein operation of said key switches retrieves characters and character combinations, each corresponding to said particular one of said ten digit binary numbers, from said sequential memory addresses; and
   memory address table means for converting table locations each corresponding to a different ten digit binary number generated by selected operation of said key switches to memory addresses corresponding to starting memory addresses of characters and sequential character combinations.

2. A programmable information entry keyboard, comprising:
   a plurality of key switches, each keyswitch corresponding to, in continuous intimate contact with, and adapted to be selectably operated by a particular terminating member of an operator's hand, said switches being selectably operable singly and in combination to generate a corresponding binary number, each digit of said number corresponding to a particular terminating member of said operator's hand; and
   memory means for storing characters and character combinations at sequential memory addresses, wherein said key switches are selectably operable singly and in combination to generate an alter code such that said memory means is placed in an access mode in which said key switches are operable to select a starting memory address and to store corresponding sequential characters and character combinations into said memory means beginning at said address to label said key switches as desired, and wherein said key switches are operable to generate an exit code such that the memory means is placed in an access mode in which said key switches are operable to select a starting memory address to retrieve corresponding and sequential characters and character combinations from said memory means beginning at said memory address in response to said selected key switch operation.

* * * * *